United States Patent [19]
Dunn et al.

[11] Patent Number: 6,163,536
[45] Date of Patent: Dec. 19, 2000

[54] COMMUNICATION SYSTEM INCLUDING A CLIENT CONTROLLED GATEWAY FOR CONCURRENT VOICE/DATA MESSAGING WITH A DATA SERVER

[75] Inventors: James M. Dunn, Ocean Ridge; Edith H. Stern, Boca Raton, both of Fla.; Barry E. Willner, Briarcliff Manor, N.Y.

[73] Assignee: International Business Machines Corporation, Armonk, N.Y.

[21] Appl. No.: 08/872,717

[22] Filed: Jun. 11, 1997

[51] Int. Cl.[7] .................................................. H04L 12/66
[52] U.S. Cl. ........................... 370/352; 709/218; 379/309
[58] Field of Search ..................................... 370/350, 351, 370/352, 353, 354, 355, 356; 395/200.3, 200.31, 200.33, 200.47, 200.48, 200.49; 379/308, 309; 709/200, 201, 203, 217, 218, 219

[56] References Cited

U.S. PATENT DOCUMENTS

| | | |
|---|---|---|
| 4,837,798 | 6/1989 | Cohen et al. . |
| 5,008,926 | 4/1991 | Misholi . |
| 5,289,468 | 2/1994 | Yoshida . |
| 5,428,608 | 6/1995 | Freeman et al. ..................... 370/216 |
| 5,479,411 | 12/1995 | Klein . |
| 5,495,484 | 2/1996 | Self et al. . |
| 5,546,574 | 8/1996 | Grosskopf et al. . |
| 5,608,786 | 3/1997 | Gordon . |
| 5,742,762 | 4/1998 | Scholl et al. ..................... 395/200.3 |
| 5,745,556 | 4/1998 | Ronen ................................ 379/127 |
| 5,794,039 | 8/1998 | Guck ................................. 395/683 |
| 5,822,306 | 10/1998 | Catchpole ........................ 370/216 |
| 5,873,077 | 2/1999 | Kanoh et al. ....................... 707/3 |
| 5,880,740 | 3/1999 | Halliday et al. ................... 345/435 |
| 5,884,032 | 3/1999 | Bateman et al. ............... 395/200.34 |
| 5,907,547 | 5/1999 | Foladare et al. .................. 370/352 |
| 5,991,394 | 11/1999 | Dezonno et al. ................... 379/265 |

*Primary Examiner*—Ajit Patel
*Assistant Examiner*—Bob A Phunkulh
*Attorney, Agent, or Firm*—Morgan & Finnegan, LLP; Joseph C. Redmond, Jr.

[57] ABSTRACT

A communication system includes a client controlled gateway enabling concurrent voice/data transmission in a distributed information network and a communication network between the client and a service representative of a host system provider. A computer and a modem couple the client to the gateway in the communication network over a single communication path. The computer includes a browser for searching the distributed network. The browser includes "plug-in" programs which interact with the data server in supporting voice calls between the client and the host system. The gateway functions as a shared voice data (SVD) server to couple the client to the data server after authentication of the client's identification (ID) and password. The gateway transfers data between the client and the data server over the distributed network in accordance with screens presented to the client by the host system. Concurrently, voice service is provided between a representative of the host system and the client over the communication network using "action buttons" appearing in selected screens presented to the client by the host system provider over the distributed network. One "action button" enables the client to initiate voice transmissions over the communication network concurrently while data is being transmitted over the distributed network. Another "action button" enables the host provider to initiate voice transmission over the communication network concurrently while data is being transmitted over the distributed network.

15 Claims, 19 Drawing Sheets

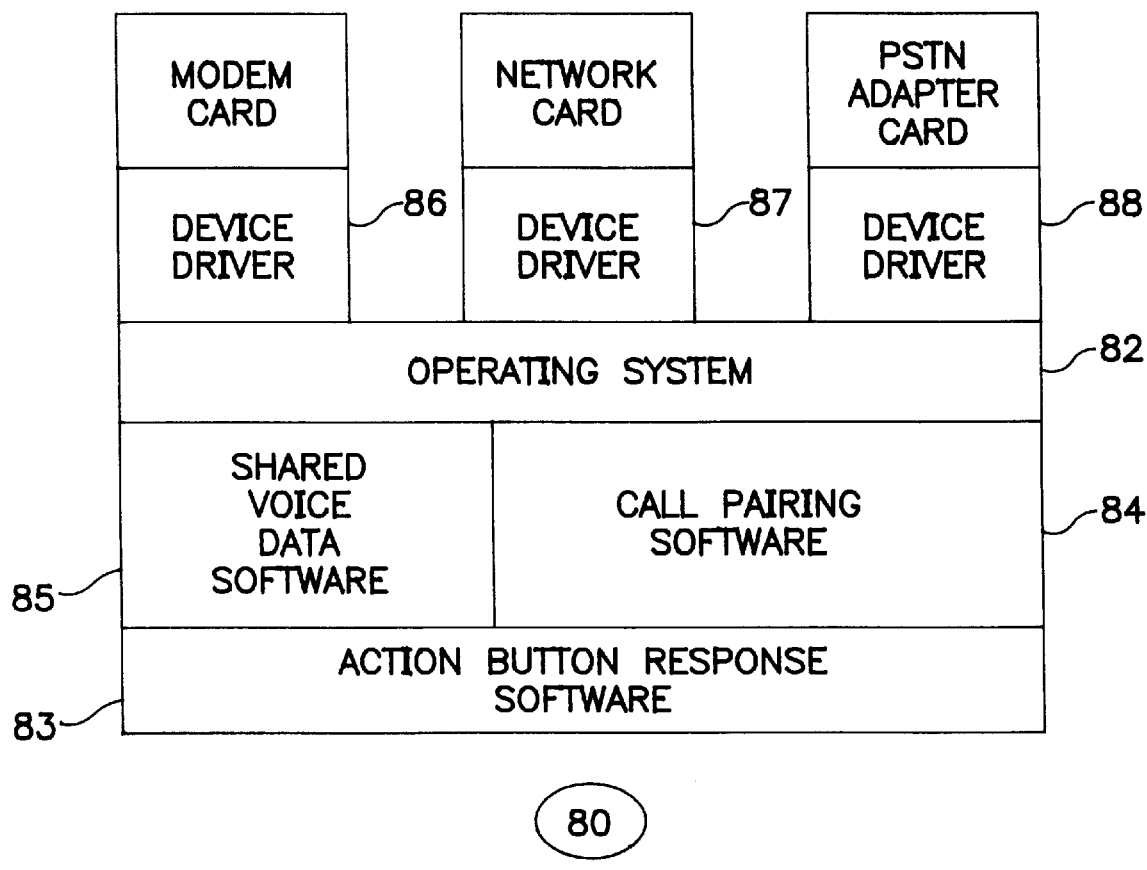
FIG. 4B-I

90

CLIENT PC DATA FILE, TYPICAL CONTENTS

- VOICE/DATA GATEWAY IP ADDRESS—MANDATORY, PART OF SET—UP PROCEDURE
- USER TELEPHONE NUMBER ⎫
- USER NAME ⎬ MANDATORY, PART OF BILLING AUTHORIZATION RECORDS
- USER ADDRESS ⎪
- + OTHER DATA, AS REQ'D ⎭
  USER E—MAIL ADD—OPTIONAL, AT SET—UP
- USER MODEM CHARACTERISTICS—MANDATORY, AT SET—UP
- USER—DHCP IP ADDRESS—FROM BROWSER
- TELEPHONE NUMBER(s) TO CALL TO CONTENT HOST, VISIBLE BEHIND THE "YOU CALL US" BUTTON (OPT)— SUPPLIED BY THE CONTENT HOST DURING THE SESSION
- USER CALL—BACK TELEPHONE NUMBER—MANDATORY THIS MAYBE EITHER THE USERS REAL TELEPHONE NUMBER IF THE USER HAS A SECOND LINE (NOT IN USE BY THE PC) ; OR IT IS THE SHARED VOICE/DATA GATEWAY TELEPHONE NUMBER (e.g 800#) AND A USER ID (A DIALABLE STRING OF DIGITS AND/OR CHARACTERS)

NOTE: OTHER FIELDS ARE POSSIBLE, SUCH AS USER CREDIT CARD NUMBERS, ETC. TO FACILITATE ON—LINE ELECTRONIC COMMERCE. IN THESE SITUATIONS, OTHER ADDITIONAL APPLICATION SOFTWARE, SUCH AS ENCRYPTION, IS ASSUMED.

CONTENT HOST DATA FILE, TYPICAL CONTENTS

- END USER TELEPHONE NUMBER (IF 2ND LINE IS AVAILABLE TO CALL BACK ON)–OPTIONAL
- VOICE/DATA GATEWAY TELEPHONE NUMBER AND END USER ID (IF SINGLE LINE IS USED BY END USER FOR SVD SERVICE)–MANDATORY
- END USER CURRENT IP ADDRESS–MANDATORY
- END USER NAME ⎫
- END USER ADDRESS ⎬ OPTIONAL, IF SUPPLIED BY END USER DATA FILE
- END USER CREDIT CARD DATA ⎭
- ETC.

- AVAILABLE CALL-IN NUMBERS–MANDATORY
    (TO SHOW BEHIND THE "YOU CALL US" BUTTON)

FIG. 5B

VOICE/DATA GATEWAY DATA FILE, TYPICAL CONTENTS

- END USER NAME ⎫ MANDATORY FOR
- END USER ADDRESS ⎬ BILLING PURPOSES
- END USER TELEPHONE NUMBER ⎭
- END USER PERMISSIONS—MANDATORY, OR ONLY ALLOW ONE CLASS OF SERVICES (e.g. "WILL ALLOW INBOUND COLLECT CALLS" ; "WILL ALLOW OUTBOUND LONG DISTANCE CALLS", ETC.
- SPACE FOR THE IP ADDRESS, AS ASSIGNED BY THE ISP (IF THE ISP IS DIFFERENT THAN THE GATEWAY)—MANDATORY
- MODEM CHARACTERISTICS—MANDATORY
- SPACE FOR CALLER-ID (IF AVAILABLE)—OPTIONAL

FIG. 5C

INBOUND CALL TO THE END USER FROM THE CONTENT HOST SERVICE AGENT INITIATED BY THE END USER

COMMUNICATION SYSTEM INCLUDING A CLIENT CONTROLLED GATEWAY FOR CONCURRENT VOICE/DATA MESSAGING WITH A DATA SERVER

BACKGROUND OF THE INVENTION

1. Field of Invention

This invention relates to communication systems and methods of operation. More particularly, the invention relates to communication systems including a client controlled gateway for concurrent voice/data messaging with a data server and a service representative.

2. Description of Prior Art

In present-day communication networks, users often access a database over a single duplex line to obtain a specific piece of information with the objective of ordering a product described in the database. An example of such a transaction would be a user accessing the Internet to connect to one or more pages of a content provider. The user would employ a data protocol such as Hypertext Transaction Protocol ("HTTP") to locate and display a page, examine its contents and perhaps place an order for the product if additional information was available by voice from the content provider. Presently, content providers do not support concurrent voice and data interaction between a user and a service representative of the provider. Some providers may support one or more of the currently available "IP-Phone" software products, but such products actually digitize a voice and use the IP Data Network to deliver the "voice" call. Current restrictions on the quality of the voice, the delay characteristics of the Internet, etc., make such interaction unacceptable. Typically, the end user has only a single duplex line to the Internet which can not support concurrent voice/data transmissions. Usually, the end user copies down a phone number and places a separate call to the listed telephone number of the content provider.

To overcome limitations of the prior art, there is need to provide a messaging system which combines the usage of a data network and a voice network into a seamless "pairing" for the purpose of making calls and transactions as described above.

Prior art related to such messaging systems, is as follows:

U.S. Pat. No. 4,837,798 issued Jun. 6, 1989 discloses a unified messaging system that provides for a single electronic mailbox for different types of messages. The mailbox can be on a user's host computer, PBX, PC, etc., and the user has consistent facilities available to originate, receive and manipulate messages. Messages can be translated from one media to another for reception, and a single message may be composed of parts that use different native media. The message recipient has a single controllable point of contact where all messages can be scanned and/or viewed.

U.S. Pat. No. 5,008,926 issued Apr. 16, 1991 discloses a message management system comprising apparatus for producing a multi-media message including a visually sensible portion and an aurally sensible portion, control apparatus for transmitting the multi-media message to a selected subscriber and an apparatus for providing notification to the selected subscriber of the arrival of a multi-media message.

U.S. Pat. No. 5,479,411 discloses a multi-media integrated message arrangement in which voice, facsimile and electronic mail messages are integrated into a system that converts e-mail messages into voice-and-fax messages. An e-mail message is parsed into voiceable and non-voiceable segments, non-prose segments. Prose segments are converted into voice messaging segments by text-to-speech facilities. Each non-prose segment is converted into a fax segment. Voice point us to fax segments are inserted into the voice message, and places corresponding to the non-prose segments in the e-mail message. The voice file and fax file are then stored for subsequent delivery of the message as an integrated voice-and-fax message. Conversion of integrated voice-and-fax messages into e-mail messages is likewise disclosed.

U.S. Pat. No. 5,608,786 discloses a unified messaging system in message which combines or makes use of existing communication channels on network. Part of the system and method relies on a data communication network forming an intermediate light of the distribution network. Telephone communication is typically used for initial or final legs. Voice mail, e-mail, facsimiles and other message types can be received by the system for retrieval by the subscriber. Communications may be centralized and retrieval in messages can be accomplished using one of a number of separate and distinct approaches. Accordingly, data communication networks such as the Internet can become global voice mail and facsimile mail systems.

None of the prior art shows or suggests a communications system including a client controlled gateway for concurrent voice and data transmissions using "paired lines" between a client and a service provider in both inbound/outbound directions.

OBJECT OF THE INVENTION

An object of the invention is a communication system and method for enabling interactive communications between a data server and a user.

Another object is a communication system including a distributed information network and a communication network for concurrent voice and data transmissions between a user and a data server.

Another object is a user controlled gateway in a communication network enabling "paired" calls with a distributed information network for voice/data messaging between a user and a data server.

Another object is a user controlled gateway in a communication network enabling concurrent voice and data transmission between a user and a service representative of a content provider in a distributed information network.

Another object is a communication system and method enabling interactive voice and data communications over a single communication path between an end user and a data server.

SUMMARY OF THE INVENTION

These and other objects, features and advantages are achieved in a client controlled gateway in a communications network for enabling concurrent voice/data transmission between a client and a service provider in a distributed information network using "paired lines" for inbound/outbound communication therebetween. A computer and a modem couple the client to the gateway in the communications network over a single communication path. The computer includes a browser for searching service providers in the distributed network. The browser includes "plug-in" programs which interact with the service provider in supporting voice calls between the client and a service representative of a service provider. The gateway functions as a shared-voice-data ("SVD") server to couple the client to the service provider after authentication of the client's identification ("ID") and password. The SVD enables the client to be coupled to the gateway over a single communication path. The gateway transfers data between the client and the service provider over the distributed network in accordance with screens presented to the client by the service provider. Concurrently, voice service is provided between a service representative and the client over the communications network using "action buttons" appearing in selected screens presented to the client by the service provider over the distributed network. One "action button" enables a client to initiate voice transmissions to the service representative over the communications network concurrently while data is being transmitted over the distributed network. Another "action button" available to the user enables the service provider to initiate voice transmissions to the client over the communications network concurrently while data is being transmitted over the distributed network. An automatic call distributor in the service provider and the gateway handle the concurrent voice and data transmissions between the client and the service representative as "paired calls".

DESCRIPTION OF DRAWING

The invention will be further understood from the following detailed description of preferred embodiment taken in conjunction with the appended drawing, in which:

FIG. 4B-1 is a representation of software stored in the gateway for implementing the system shown in FIG. 2.

FIG. 5A is a listing of data files for a user PC in responding to an "action button" activated by the user in FIG. 4A.

FIG. 5B is a listing of data files at a content host for initiating an "action button" by the service representative in the system of FIG. 3.

FIG. 5C is a listing of data files for a voice-data gateway in responding to the action buttons activated by a user in the system of FIG. 3.

DESCRIPTION OF PREFERRED EMBODIMENT

Figure 1:
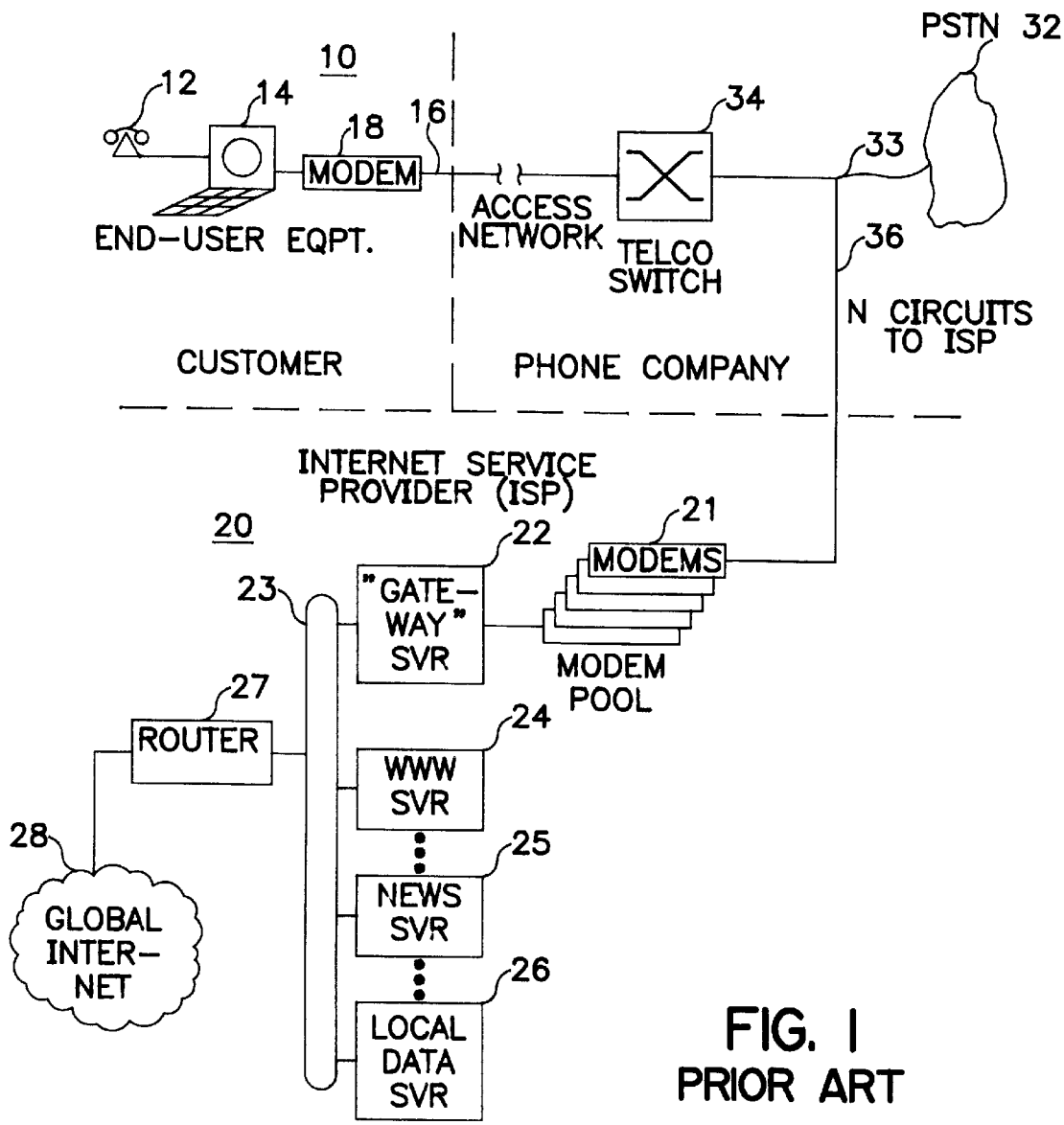
FIG. 1 is a prior art representation of a user or customer connected to a service provider e.g an Internet Service Provider (ISP) in a distributed information network through a telephone company.

In FIG. 1, a customer or user station 10 is connected to a service provider 20 in a distributed information system, e.g the Internet through a telephone company (Telco) 30 which is part of a Public Switched Telephone Network (PSTN) 32. The user station 10 includes a telephone 12 linked to a computer 14 which is connected to the Telco 30 over a single duplex line or communication path 16 via a modem 18. The computer includes software for interacting with the service provider as will be described hereinafter.

The modem 18 is coupled to a standard access network and a switch 34 to connect the user station to any connection point in the PSTN or service provider. The network 30 is linked to a service provider through a plurality of circuits 36 for accessing the service provider by a plurality of customers, users or subscribers.

The Service Provider 20 has a plurality of modems 21 for responding and replying to calls originated by the user to the service provider. Each Modem 21 is coupled to a Gateway Server 22 which includes software (to be described hereinafter) for authenticating a user and authorizing access to the Internet based on a user identification (typically an Internet address) and a personal identification number or a password. When access is granted to a user by the Server 22, other servers are made available to the user over a Bus 23. Among the servers available to a user could be a Worldwide Web ("WWW") Server 24, a News Server 25 and a local data server 26. If a user desires services not available by the service provider, a connection is made available through a Router 27 to a Global Internet 28. A user is able to search or "surf" around the Net 28 for a series of point to point connections to various content providers and the host server where the specific content is located. The operation and other details of the Internet are further described in a text entitled "How the Internet Works" by Joshua Eddings, published by Ziff-Davis Press, Emeryville, Calif. 1996 (ISBN 1-56276-192-7).

Present day service providers do not make available a convenient means of communicating with a user in real time in both directions, as previously explained. Such a limitation is particularly true for a user having a single duplex line connection 16 to the Telco 30. The present invention overcomes such limitation as well as other limitations as will now be described.

One limitation relates to concurrent voice and data transmissions in the PSTN and the Internet. In particular, the data network and the voice network are combined into a seamless "pairing" for the purpose of making interactive calls by either the user or the service provider so that such limitation has been overcome by the present invention.

Another problem is enabling a user to access a data site and initiate a calling process over the PSTN or paired voice/data networks between the data site and user by activating a contact-host provided button or other icon on the data sites page appearing at the user's computer 14. A related problem allows an end user to select a button or icon on a data site page appearing before the user which initiates a call over the PSTN or paired voice/data networks to the user by a representative of the service provider. Both of these problems have been overcome by the present invention, as will now be described.

Figure 2:
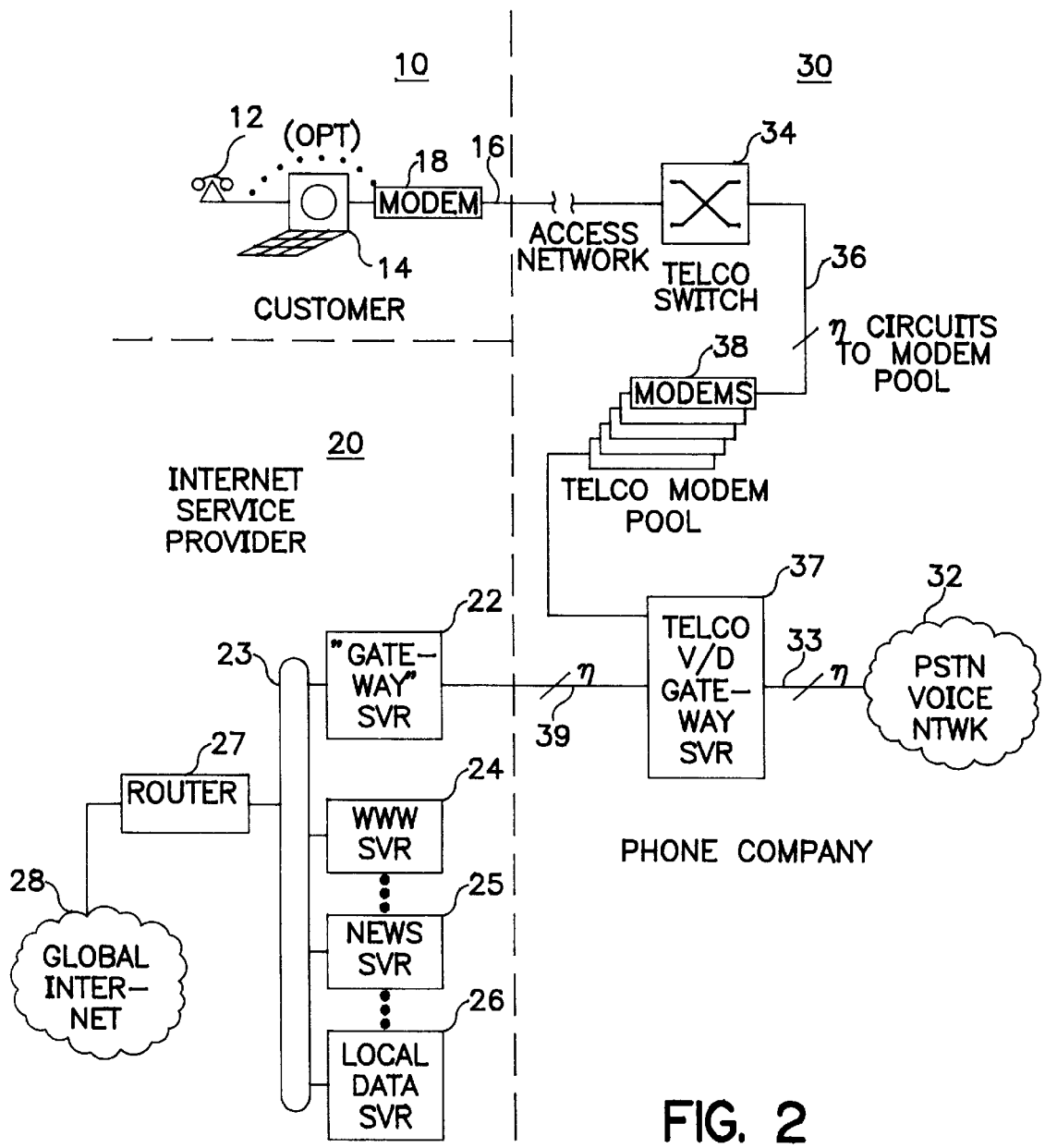
FIG. 2 is a representation of a user or customer connected to an enhanced telephone company including a client controlled gateway coupled to a service provider in a distributed information network and a Public Switched Telephone Network ("PSTN") in accordance with the principles of the present invention.

In FIG. 2, the communication system of FIG. 1 has been modified to include a Shared Voice/Data Server ("SVD Server") 37 and a Modem Pool 38 which are connected between the switch 34 and the PSTN 32. Both the Server 37 and Modem 38 are located in a Switching Center 34 serving the Customer Station 10. The Server 37 is further coupled to the ISP 20 through Server 22 over a plurality of Circuits 39. The Server 37 is also coupled to the PSTN 32 over a plurality of Circuits 33.

In FIG. 2, the User 10 still dials the phone number of the Provider 20 through the Modem 18. The Answering Modem Pool 38 is now at the Station 30. In response to a Modems 38 the Server 37 authenticates the modem ID of the Station 10 and optionally the user ID. If the Provider 20 authorizes, the Gateway 37 may supplant the Authentication Server 22 at the provider. If the provider does not so authorize, the Server 37 is still required to authenticate the user level ID. In any case, the ID for the Modem 18 is authenticated at the Server 37.

For a data connection, the Gateway 37 passes a connection to the ISP 20 over Circuits 39 and normal Internet interaction takes place between the Provider 20 and the User 10. At this point, the Server 37 is a "pass through" for the data path. However, the Server 37 is itself an Internet Addressable Server. That is, the Server or Gateway 37 has its own Internet style [HTTP://www.user name.domain (com., org.)] address. The address for the Server 37 is the address the Modem 18 uses in its authentication routine. Authentication servers are well-known in the industry. A connection of the Gateway Server 37 to the PSTN 32 will be described hereinafter.

Figure 3:
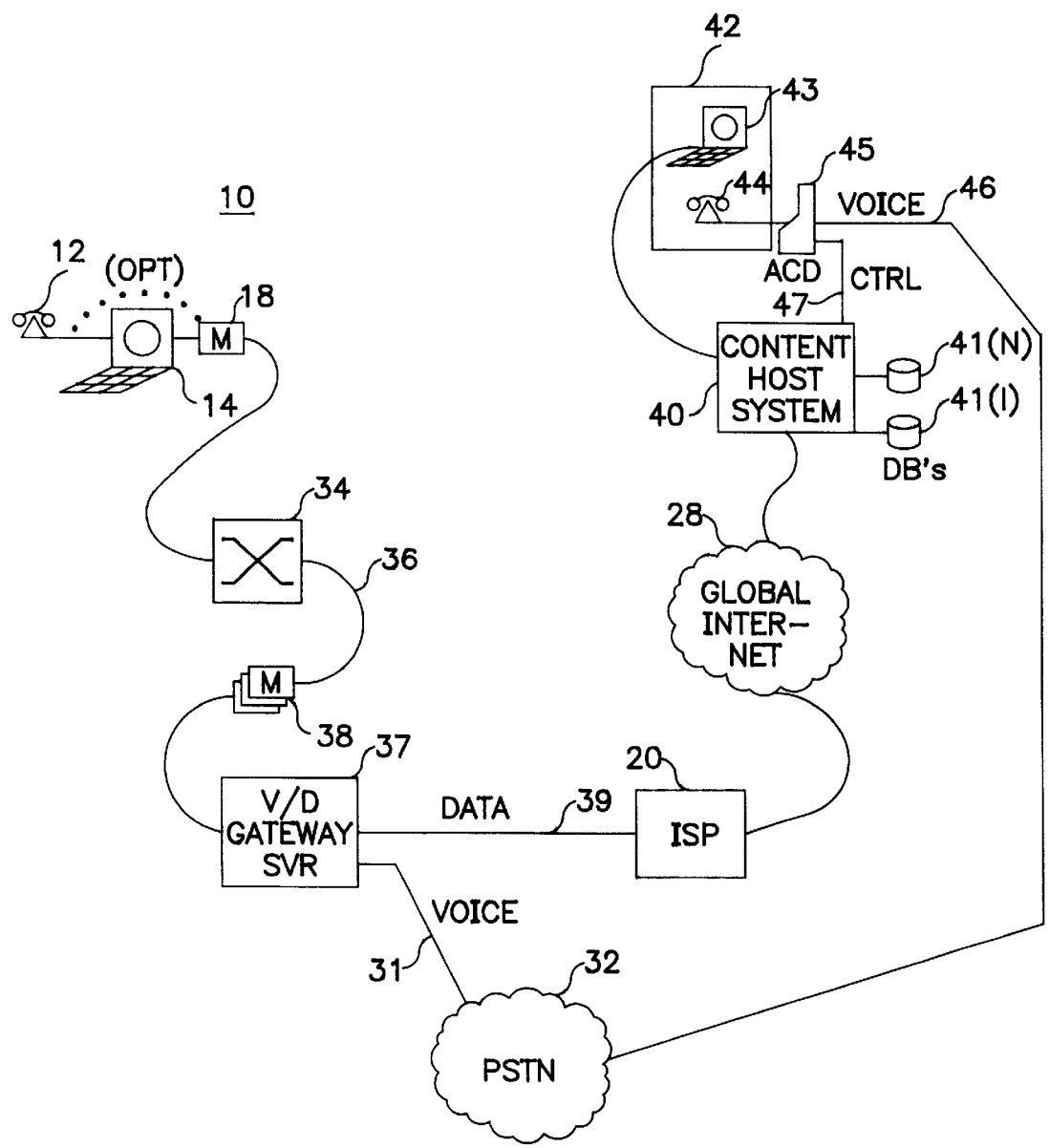
FIG. 3 is a representation of a "paired call" between a user and a service representative in the system of FIG. 2.

Turning to FIG. 3, the enhanced Internet/PSTN System of FIG. 2 will now be described for concurrent voice and data calls, both inbound/outbound between a user and a content host provider using "paired calls." In FIG. 3, a Content Host System 40 is coupled to a global Internet 28; a plurality of Databases 41(1) . . . 41(N) containing data of interest to a user; a Customer Representative Station 42 including a Computer 43 and a Telephone 44. The Station 42 may also be connected to an Automatic Call Distributor 45 (ACD) which is coupled through Voice Lines 46 to the PSTN 32 and through Data Lines 47 to the Host System 40 and thence to the global internet 28.

The user accesses the content host provider by running the software stored in the Computer 14. Such software enables the user to connect to the Internet and access the Content Host 40 using search software or a browser, both well-known in the art. In response to the user access, the content host provider transmits "pages" which are displayed at the Computer 14, one at a time as selected by the user. It is apparent that any data network and user interface can be made to operate in the same manner as previously described. For purposes of the present description, the browser, such as Netscape Navigator 3.0 will serve as the user interface and new software will be added to the Computer 14 as a "plug-in" to carry out the functions of the "paired calling", to be described hereinafter. A "plug-in" is a program that operates and executes within the browser. It is apparent that other methods such as "helper application" programs that are initiated by the browser and execute outside browser may also be installed in the Computer 14.

Figure 4A:
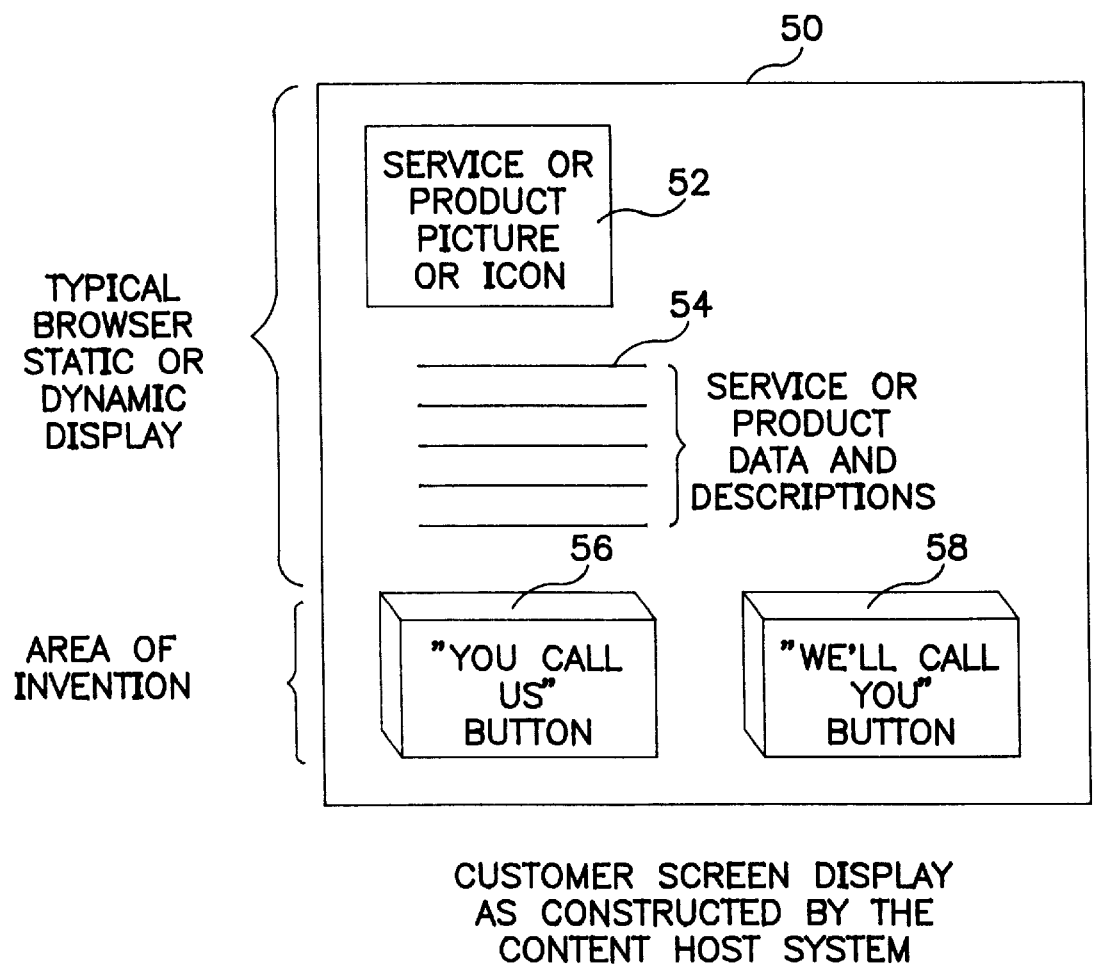
FIG. 4A is a representation of a user screen showing "action buttons" constructed by a service provider in response to a user inquiry for the system of FIG. 2

In practice, the user accesses a Data Page 50, an example of which is shown in FIG. 4A, using the browser software. The Page 50 contains a usual Photograph 52 and Text 54 describing a product or service. In addition, at least one "action button" is incorporated into the page. One Action Button 56 initiates a voice call to the Service Station 42 when depressed by the user. A second Action Button 58 initiates a voice call to the user by the service representative when depressed by the user. It is apparent that any number of action buttons may be installed in the Page 50. The operation of the buttons which initiates inbound/outbound voice call in real time while the product or service is displayed in the page will be described hereinafter.

To accomplish the functions of "paired calls" together with inbound/outbound voice calls in real time with the page display, new software is required at the Content Host 40; the Shared Voice Data Gateway 37 and the user Computer 14 (see FIG. 3). In operation the end user has a Computer 14 and a regular Telephone 12, although a sound card can be used in a computer. The Modem 18 is optionally internal to the computer or external. The Telephone 12 could connect to the computer or optionally could connect by its own line to the external modem. In all of the above cases, the Line 16 from the user station to the Switching Station 30 is a single, shared voice and data circuit. A Shared Voice and Data Line 16 is well known in the art. The user Modem 18 and the Gateway 37 are matched at their respective ends to inter-operate correctly. The Gateway 37 operates to have a data portion of a session remain on the data network to the provider or content host without interruption, while the voice portion of a call is captured, handled, and routed by the Gateway 37 and the PSTN Network 32 between the user and the content host. The concurrent voice and data transmissions in the Internet and the PSTN are termed "paired calls" for purposes of carrying out this invention.

Figure 4B:
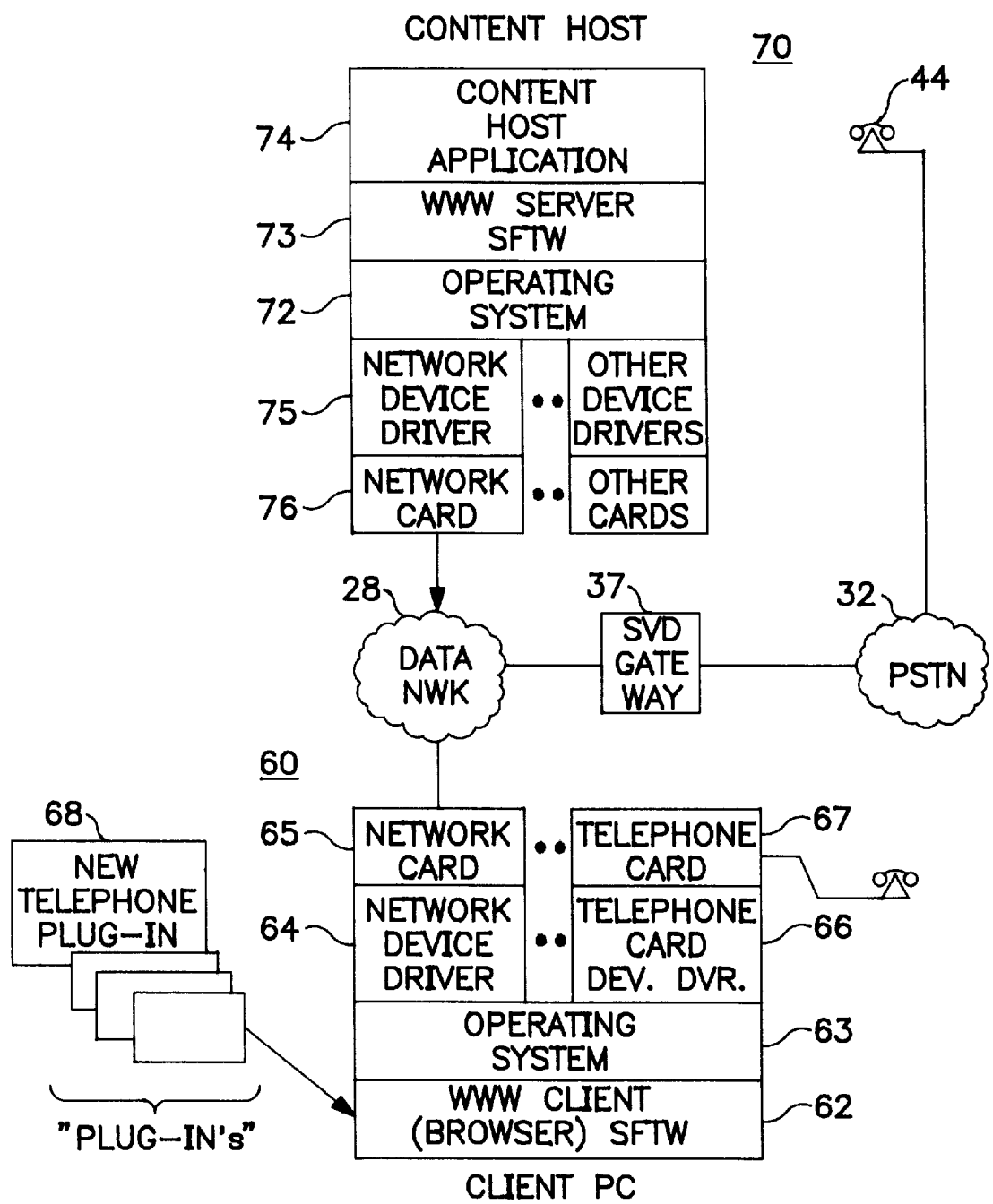
FIG. 4B is a representation of software stored in a host for a content provider and the user station for implementing the system shown in FIG. 2.

FIG. 4B shows examples of software 60, 70 and 80 installed in the client PC 14; the content host system databases 41/41n, and the gateway server 37, respectively (See FIG. 3). The client PC software 60 provides the user with the necessary functions to perform Internet connection and concurrent voice data communication with the content host. Included in the Software 60 is a Browser 62 such as Netscape Navigator; an Operating System 63 such as the IBM operating system OS-2, a Standard Network Device Driver 64 for connecting to the data network through an Interface Card 65. Also included is a Telephone Card Device Driver 66 and a Telephone Interface Card 67 for connection to the PSTN 32 and the content host service provider telephone 44.

Included in the Browser 62 are new Telephone Plug-in software 68 which support the voice calls and address the Shared Voice Data Gateway 37 functions. The Plug-ins 68 interact with the action buttons support code included in the content host, as will be described hereinafter. Operating the action buttons follow the same methods as other Internet interactions take place between a user and a content provider.

The content host Software 70 interacts with the user and the Shared Voice Data Gateway 37. Included in the Software 70 is an Operating System 72 such as OS2 and a Worldwide Web Server 73 for interacting with the users. The Server 73 accesses the content host application software for responding to the inquiries by the user. The Software 70 is connected through a Device Driver 75 and an Interface Card 76 to the data Network 28. The host Software 70 includes other device drivers and other network cards for talking to different types of data network. The new software installed in the host application to support the action buttons will be described in connections with FIGS. 6 and 7 and is based on Internet functions such as a CGI-BIN call, a host resident script, a resident JAVA program, etc. These support techniques are well known in the Internet and are believed self-explanatory.

In FIG. 4B-1, the Gateway Software 80 stored in the Client Controlled Gateway 37 includes an Operating System 82; action button software 83 responsive to the Plug-in 68; Call Pairing Software 84 and Shared Voice Data Software 85. The Software 80 further includes a modem card and device driver 86 for communicating with the client PC 14; a network card and device driver 87 for communication with the Service Provider 20, and a telephone interface card and driver 88 for communication with the PSTN.

In addition to the Software 60, 70 and 80, the user Computer 14; Content Host 40 and Shared Voice/Data Gateway 37 contain Data Files 90, 91 and 92, respectively, examples of which are shown in FIGS. 5A, 5B, and 5C, respectively. The data in the Files 90, 91 and 92 is necessary to support the functions of connecting a user to the Internet and PSTN; enabling concurrent voice/data transmissions for the inbound/outbound directions in connection with the use of the Action Buttons 56, 58 shown in FIG. 4A. Essentially, FIG. 5A describes examples of user information files available at to the gateway and content host necessary to implement voice and data transmissions. FIG. 5B describes examples of content host files which contains user information obtained from the user files for supporting the voice and data transmission between the content provider and the user. FIG. 5C describes examples of files at the gateway for handling the action buttons and interaction between the content host and the user. Further explanation of the data files will be given as a part of the operation of the system.

A brief overall description of the system operation will be given as background for the operation of the action buttons. After a user has accessed a content host page, the user may select either the "you call us" Button 56 or "we'll call you" Button 58 (See FIG. 4A). In either case, the content host sends a file or a message to the user Browser 632 (See FIG. 4B) to activate the Plug-ins 68. The plug-in programs execute according to FIGS. 6 and 7 as will be described hereinafter. In the case of the "you call us" selection, the content host transfers to the plug-in a telephone number to call from its data files 91. When the user Computer 14 places a call to the content host, the plug-in transfers to the content host the required and optional data for its data files 90 (e.g., current IP address, name, address, etc.) and other information such that the Service Representative 42 (See FIG. 3) can answer the call and know who is on the other end, what page of data is being viewed and have available billing information.

To activate a voice call to the content host, the plug-in addresses a message to the Gateway 37. The message contains a number to dial out to the PSTN and the end user's ID so the Gateway 37 can attach the end user's phone number or personal identification number to the call. The user's phone number or PIN is necessary so that an incoming call through the Automatic Call Distributor 45 (See FIG. 3) can be correlated to the incoming data stream into the content host. Several well known automatic call distributor-host packages support this correlation. An example is the IBM Call Path Product. The user message also contains other data the Gateway 37 needs to process and eventually bill the call. The processing and billing information could be in each message, or it can be in a database kept by the gateway in a user profile that is activated by the incoming message.

In response to the content host call, the user has dialed a telephone number without having to know it since the automatic call distributor passes the number to the plug-in which contacted the Gateway 37. Alternatively, the data content host button may have a list of possible numbers associated with it. In such a case, the plug-in could display on an on-screen list for the user to choose from. Thereafter the call progress would be the same.

When the automatic call distributor answers the user telephone call, the data and voice calls are paired at that end. The Gateway 37 answers the supervision by the automatic call distributor and attaches the PSTN trunk to the end user shared voice/data line, after which normal conversation ensues. The operation of the shared voice/data gateway is such that the data connection is not disturbed. Eventually, the phone conversation ends, the Gateway 37 takes down the voice connection, leaving the data connection in whatever state it currently is.

In the event the end user selects the "we'll call you" Button 58, the sequence is similar but modified since the automatic call distributor must originate the call. In such case, the automatic call distributor sends a file or message to the plug-in in the user Computer 14. The plug-in sends back the end user's telephone number or gateway telephone number in its data files depending on how the plug-in is configured. If a user has a second line, a second line telephone number is configured. If the user has only a single shared voice/data line, the typical case, the shared voice/data gateway number is used.

Having the automatic call distributor call the Gateway 37 (for example, an inbound 800 number type call) is not sufficient to connect the call to the user. The message from the plug-in to the automatic call distributor contains a shared voice/data gateway number plus a user ID. This ID could be either a personal identification number or perhaps an end user's real telephone number. The ID only needs to be unique for mapping a call, and later for the gateway to bill the call, if required.

The Gateway 37 will detect the incoming automatic call distributor generated call, and will obtain a calling line number pair ("CLG" and "CLD") where CLD will be the gateway number and CLG will be the automatic call distributor number. The Gateway must answer the call, and then the automatic call distributor can send (out dial) the user ID. The gateway checks to see if the user is currently on line and if so sends a message to the plug-in that the call has arrived. If the user answers the call (by picking up the phone, or by screen selection), the gateway joins the incoming trunk to the end user's circuit, and normal telephone functionality is available. If the end user does not answer the call, normal ringing tone is heard at the automatic call distributor service agent position. Eventually the voice call ends, and the gateway takes down the connection and performs any required billing function.

Now turning to FIGS. 6 and 7, examples of the call flows and the exception procedures for the use of the action buttons in "paired calls" will now be described in conjunction with FIGS. 3, 4A, 4B, and 5A–5C.

Figure 6A:
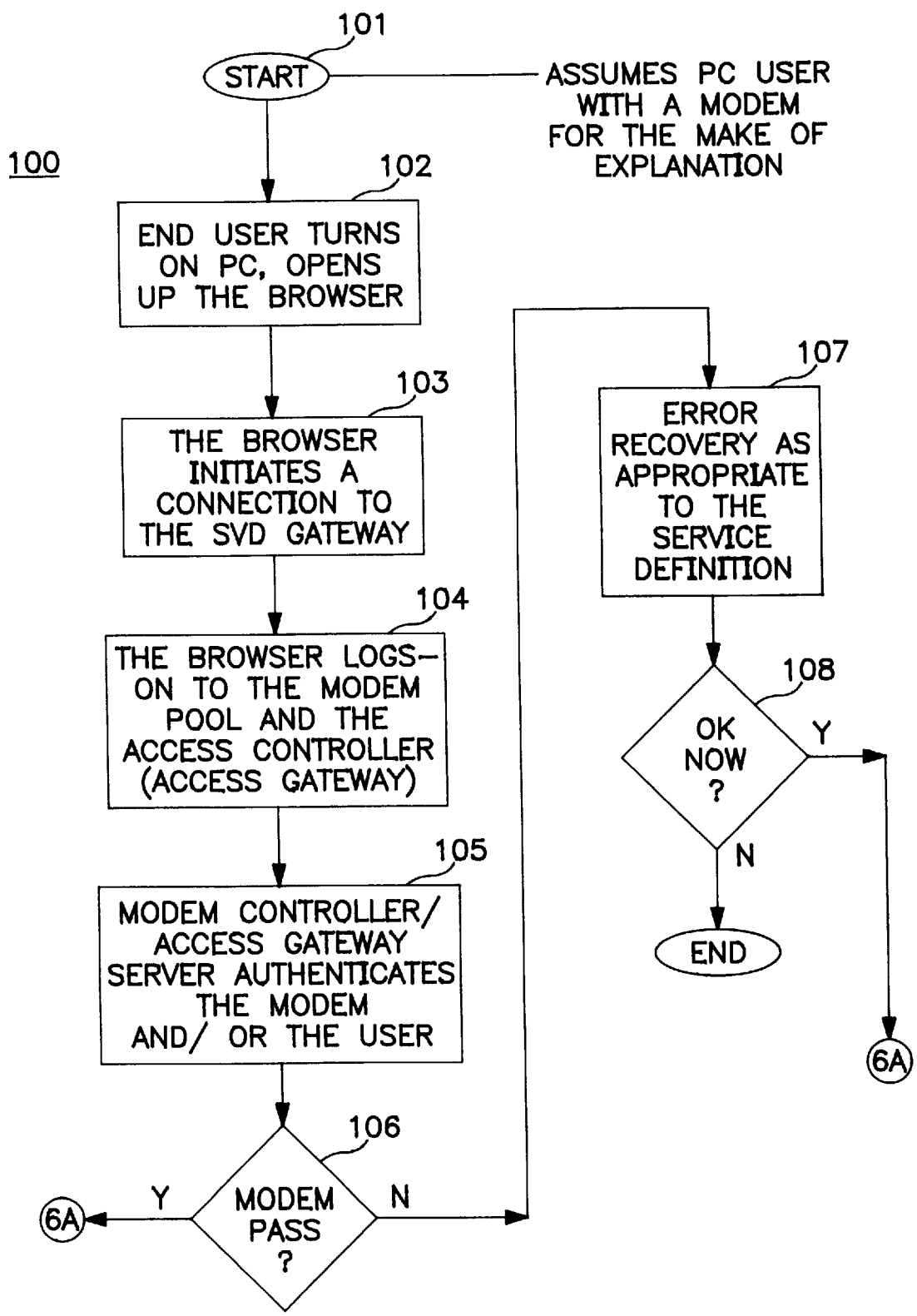
FIGS. 6A–F are flow diagrams of an outbound call to a content provider initiated by an end user in the system of FIG. 2 .

In FIG. 6A, a process 100 is described for initiating an outbound call to a content host initiated by an end user. The process is entered in a start step 101 which assumes that the user has a PC with a modem as described in conjunction with FIGS. 2 and 3. A step 102 is performed by a user in turning on the PC and activating the browser 68 shown in FIG. 4B. The browser initiates a connection to the gateway 37 in a step 103. The browser logs on to the modem pool and the access gateway 37 in a step 104. In a step 105, the gateway server authenticates the user's modem or the user. A test is performed by the gateway in a step 106. A "yes" condition, transfers to a node 6A shown in FIG. 6B. A "no" condition, initiates an error recovery as appropriate to the server's definition in a step 107. A test is performed in a step 108 to determine whether the error recovery has been overcome. A "no" condition terminates the process 100. A "yes" condition transfers to the node 6A in FIG. 6B.

Figure 6B:
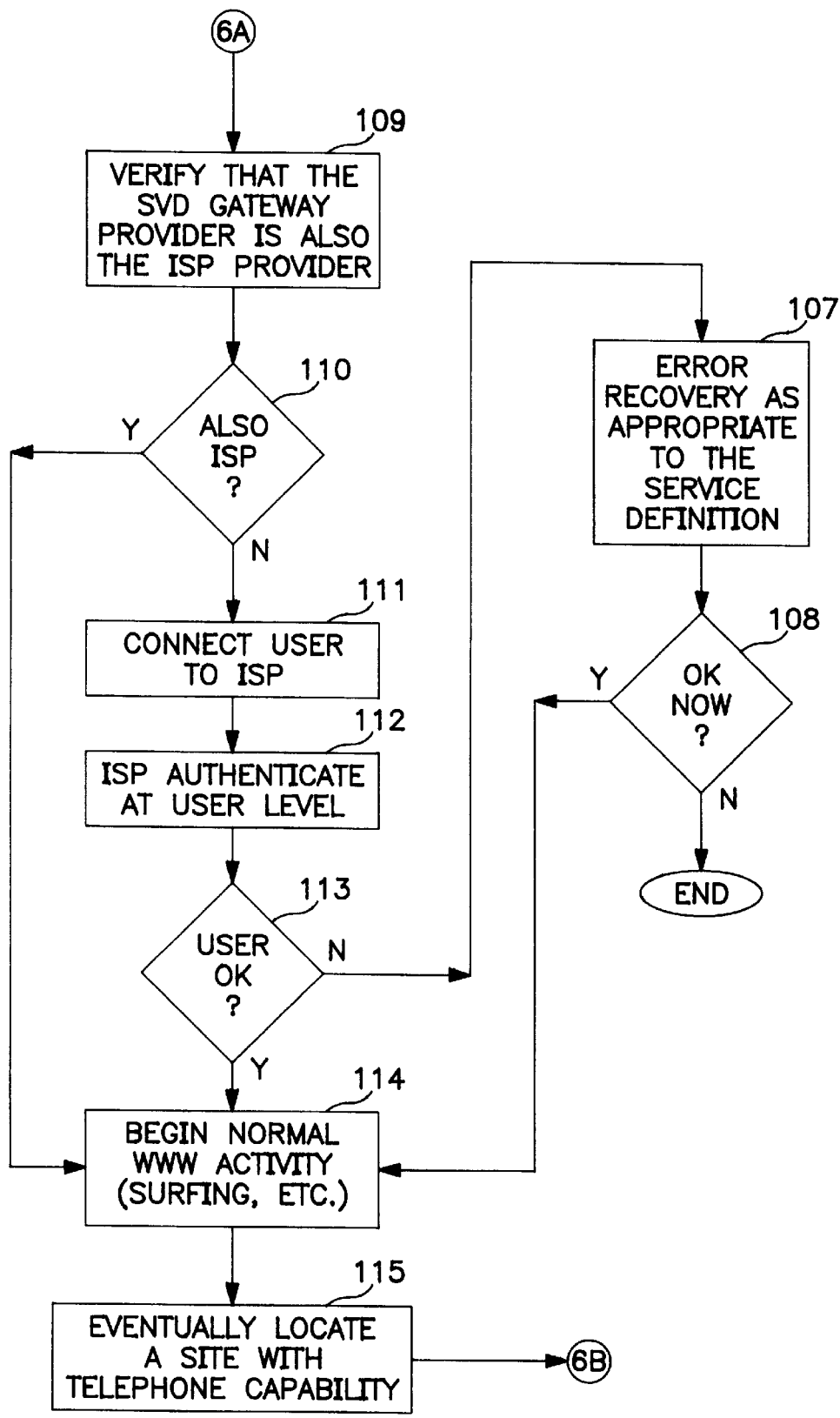

Turning to FIG. 6B, a step 109 is performed in response to node 6A. The step 109 verifies that the gateway provider is also the service provider 20 (see FIGS. 2 or 3. A test 110 is performed for this verification). A "yes" condition transfers the process to a step 114 to be described hereinafter. A "no" condition initiates a step 111 to connect the user to the service provider. A step 112 is performed by the service provider to authenticate the user. A test 113 is performed to determine whether the user is authorized. A "no" condition initiates the error recovery and test steps 107, 108, respectively, described in conjunction with FIG. 6A. A "no" condition ends the process. A "yes" condition transfers the process to a step 114 in which the user begins normal world-wide web activity, i.e., searching or surfing. After locating a site in a step 115 with telephone capabilities, the process transfers to a node 6B in FIG. 6C.

Figure 6C:
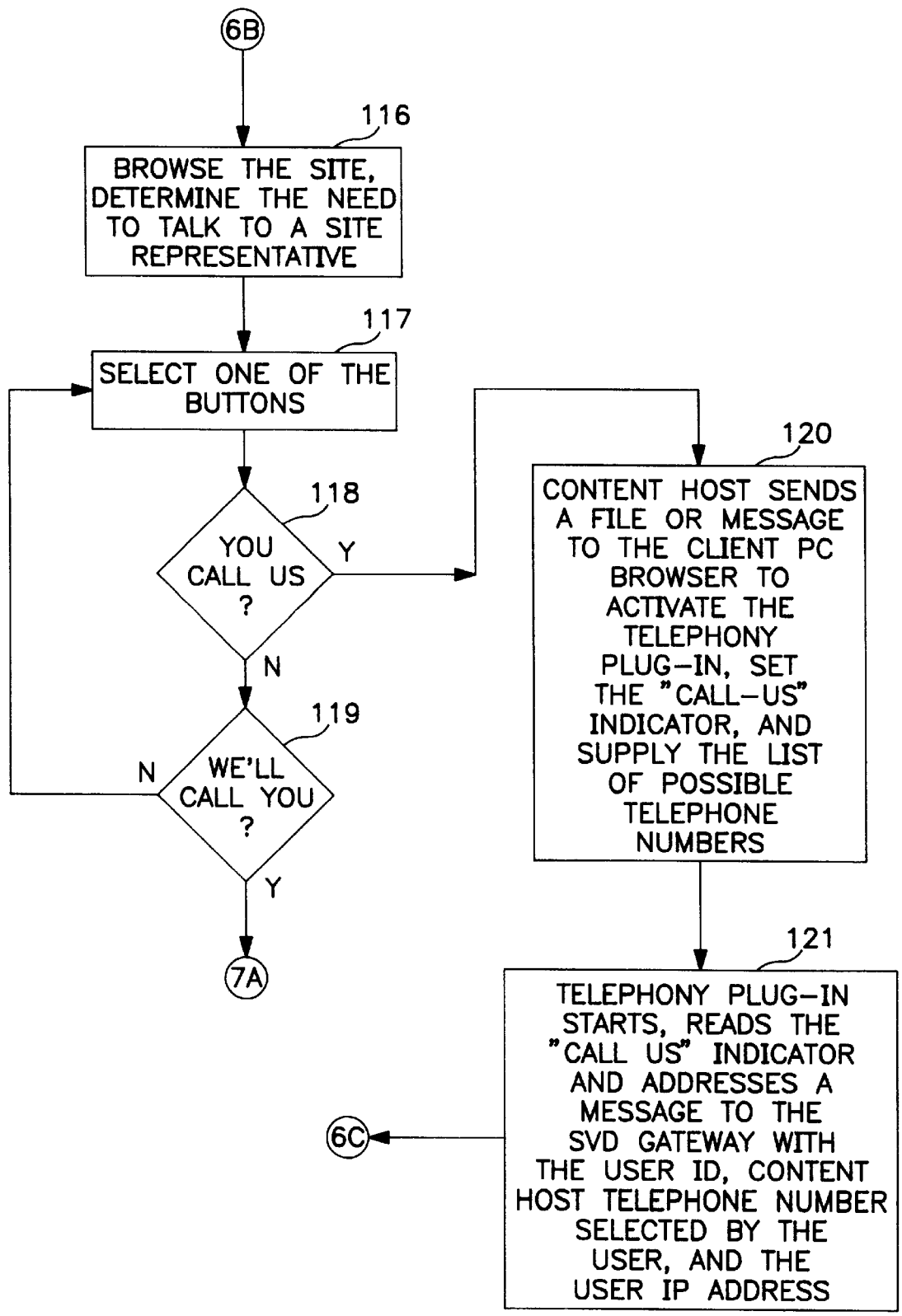

Turning to FIG. 6C, a step 116 is performed in response to node 6B in which the user reviews the content host pages to determine whether a need exists to talk to a service representative. In a step 117, the user selects one of the action buttons. A test is performed in a step 118 to determine whether the user should call the service representative or in a step 119, the service representative will call the user. A "yes" condition for step 118 initiates a step 120 in which the content host sends a file or message to the client PC to activate the plug-ins; set the "call us" indicator; and supply the list of possible telephone numbers. In response to the step 120, the user computer in a step 121 initiates the plug-ins to read the "call us" indicator; and address a message to the gateway 37 with the user's ID, content host telephone number selected by the user, and the user's internet address, after which the process transfers to a node 6C in FIG. 6D.

Returning to the step 118, a "no" condition initiates a step 119 to determine whether the service representative will call the user. A "no" condition returns the process to the step 117. A "yes" condition transfers the process to a node 7A in FIG. 7A.

Figure 6D:
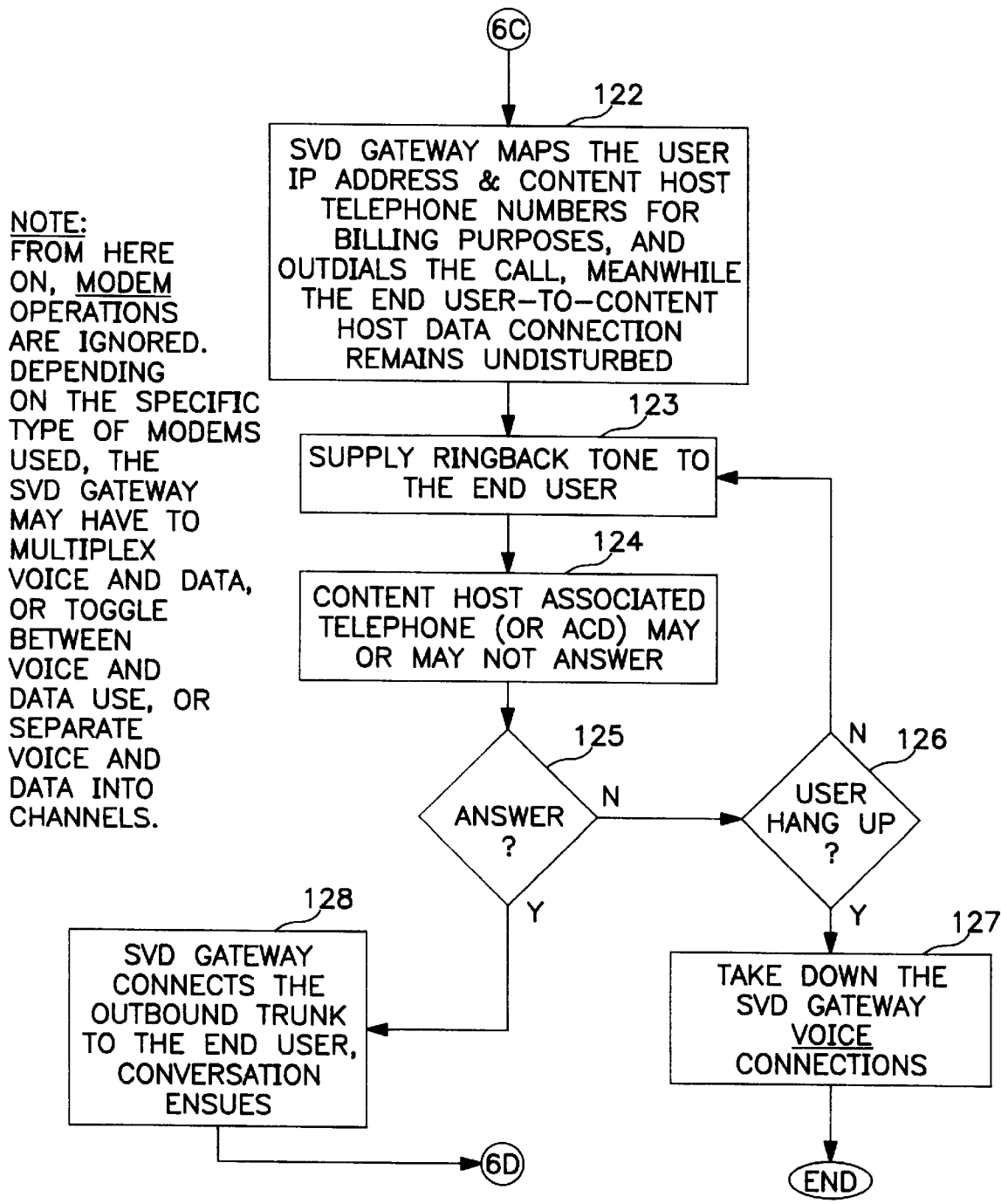

Turning to FIG. 6D, the gateway 37 maps the user's IP address and content host telephone numbers for billing purposes and out dials the call to the automatic call distributer in a step 122. During the period, the end user to content host data connection remains undisturbed. In response to the call, the automatic call distributer supplies a ring back tone to the end user in a step 123, after which the content host telephone automatic call distributer may or may not answer in a step 124. Note from here on, modem operations will be ignored. Depending on the specific type of modem used, the gateway may have to multiplex voice and data or toggle between voice and data use or separate voice and data into channels in accordance with well known communication techniques.

In response to the step 124, a test 125 is performed to determine whether the content host answer's the call. A "no" condition transfers to a test 126 in which the user hangs up for a "no" condition or in which the gateway 37 terminates the voice connections in a step 127 for a "yes" condition, after which the process ends.

Figure 6E:
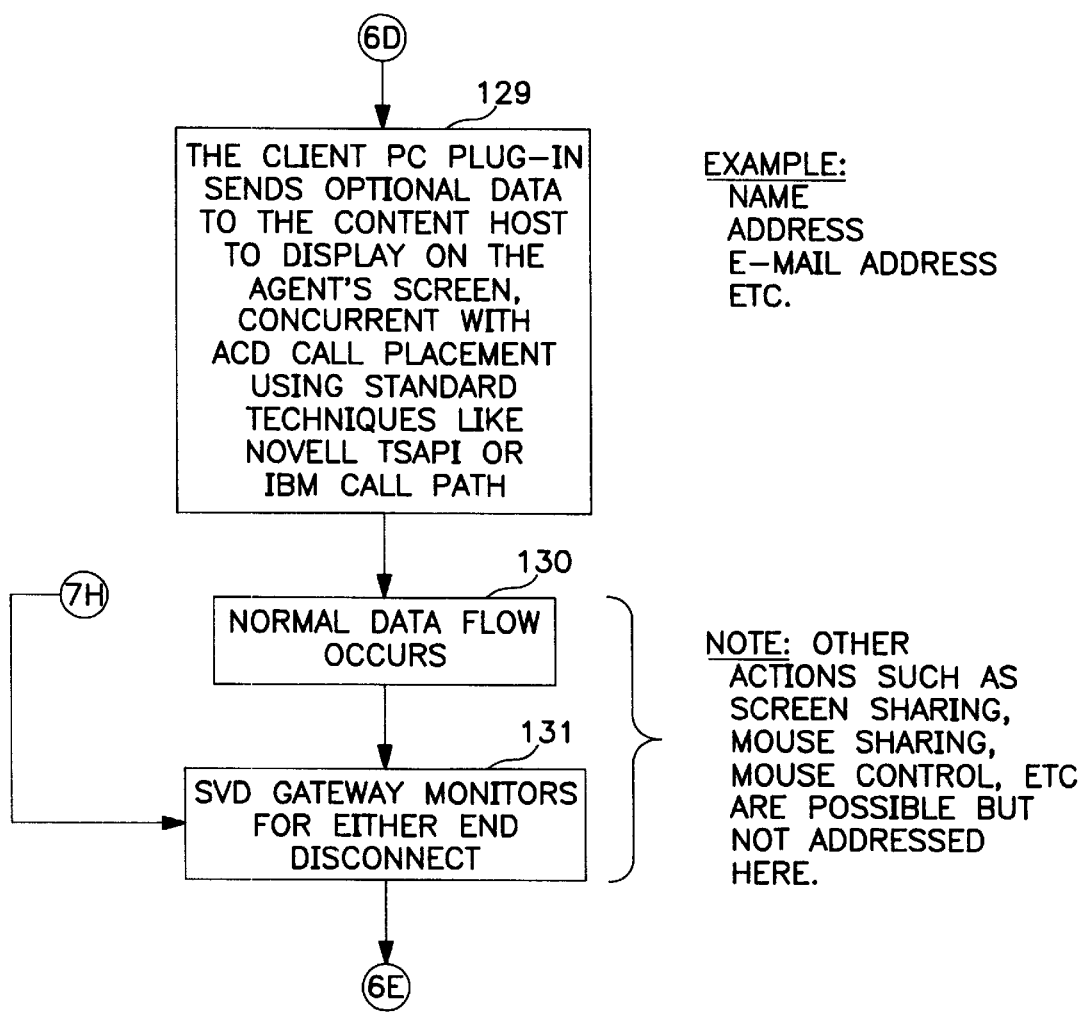

A "yes" condition for the test 125 initiates a step 128 in which the gateway connects the outbound trunk to the end user for conversation purposes between the service representative and the user, after which the process transfers to a node 6D shown in FIG. 6E.

Turning to FIG. 6E, a step 129 is performed in response to node 6D. The step 129 initiates the user plug-ins to send optional data to the content host to display on the agent's screen concurrent with the automatic call distributer call placement using structured techniques like Novell TSAPI or IBM Call Path. Normal data flow occurs between the content host and the user in a step 130 during which the gateway monitors the user or call distributer for disconnect in a step 131, after which the process transfers to a node 6E in FIG. 6F. Note that during the steps 130, 131, other actions such as screen sharing, mouse sharing, mouse control are possible while data flow occurs but will not be described for purposes of brevity.

Figure 6F:
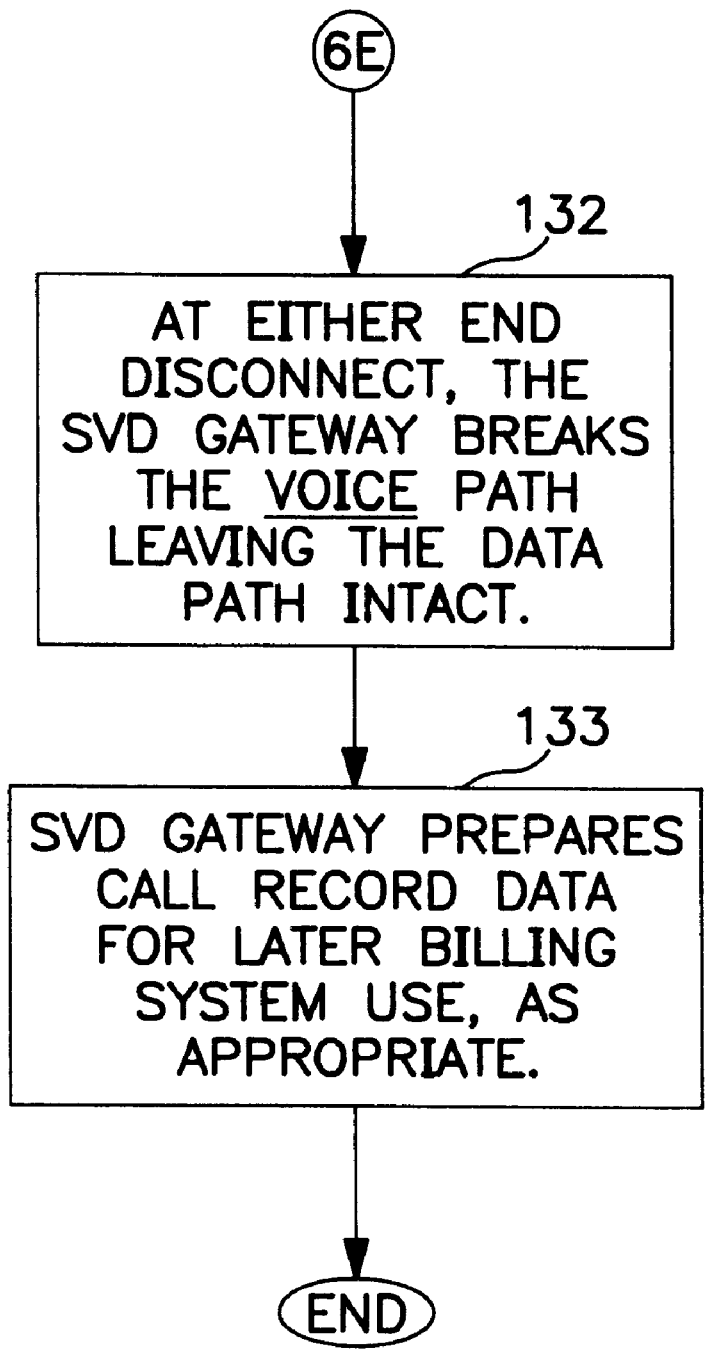

In FIG. 6F, a step 132 is performed in response to the node 6E. In step 132, the gateway 37 breaks the voice path leaving the data path intact at either end if either the user or the content host should disconnect. Upon disconnect, the gateway in a step 133 prepares call record data for billing system use as appropriate after which the process 100 ends.

Figure 7A:
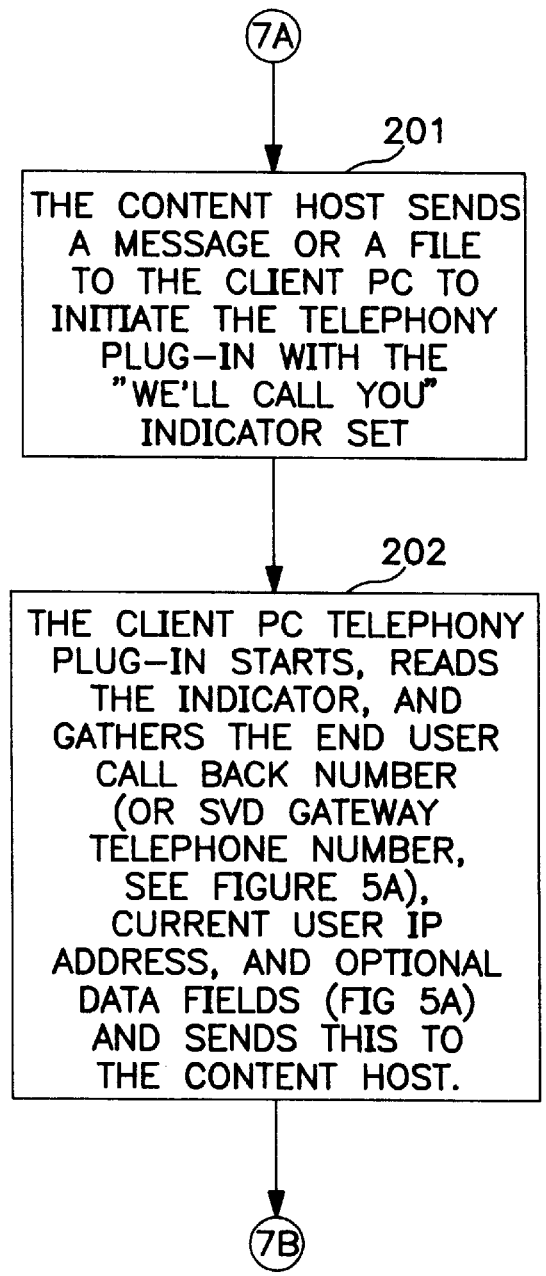
FIGS. 7A–D are flow diagrams of an inbound call to an end user from a content provider initiated by the end user in the system of FIG. 2.
Figure 7B:
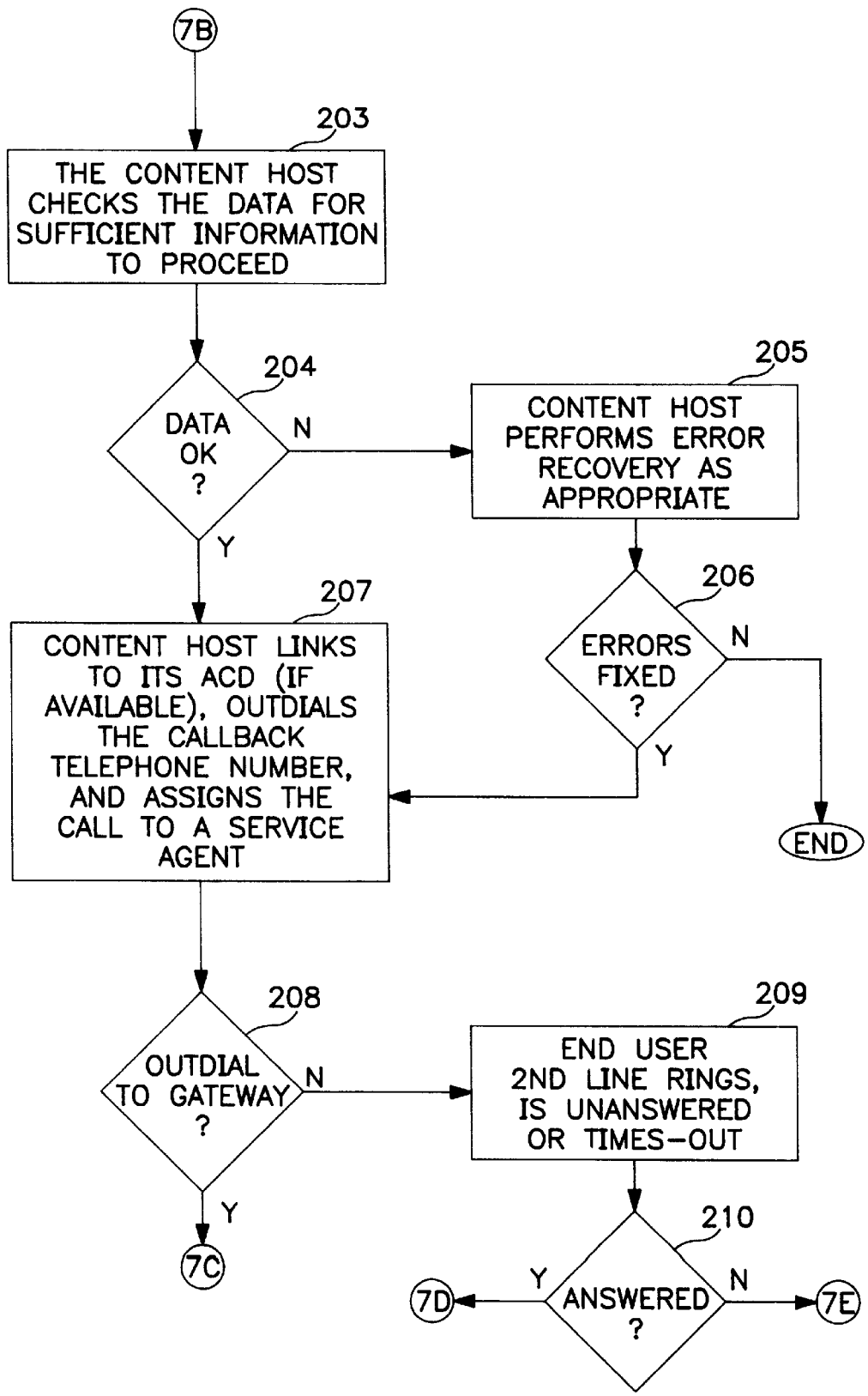

Turning to FIG. 7A, a process 200 will be described for an inbound call to the end user from the contact host service agent initiated by the end user. The process is entered from node 7A in FIG. 6C, after which a step 201 is performed in which the content host sends a message or a file to the user to initiate the telephone plug-ins and set the "we'll call you" indicator 58 (See FIG. 4A). In response to the setting of the indicator 58, a step 202 is performed by the user in which the user plug-ins 68 (See FIG. 4B) reads the indicator 58 and gathers the end user call back number or gateway telephone number; the current user IP address and optional data files shown in FIG. 5A, after which the user computer sends the information to the content host and the process transfers to a node 7B shown in FIG. 7B. A step 203 is performed by the content host in response to the node 7B. In step 203 the content host checks the user data for sufficient information to proceed. A test 204 is performed to determine whether sufficient data is available. A "no" condition initiates a step 205 in which the content host program performs error recovery as appropriate. A test is performed in a step 206 to determine whether the errors are fixed. A "no" condition ends the process 200. A "yes" condition transfers the process to a step 207. Likewise, a "yes" condition from the step 204 transfers the process to a step 207 in which the content host links the automatic call distributer which out dials the call back telephone number and assigns the call to a service agent. A test 208 is performed to determine if the call back number is out dialed. A test 210 is performed to determine if the second line is answered. A "no" condition transfers the process to a node 7E to be described in conjunction with FIG. 7E. A "yes" condition transfers the process to a node 7D which is to be described in conjunction with FIG. 7D.

Figure 7C:
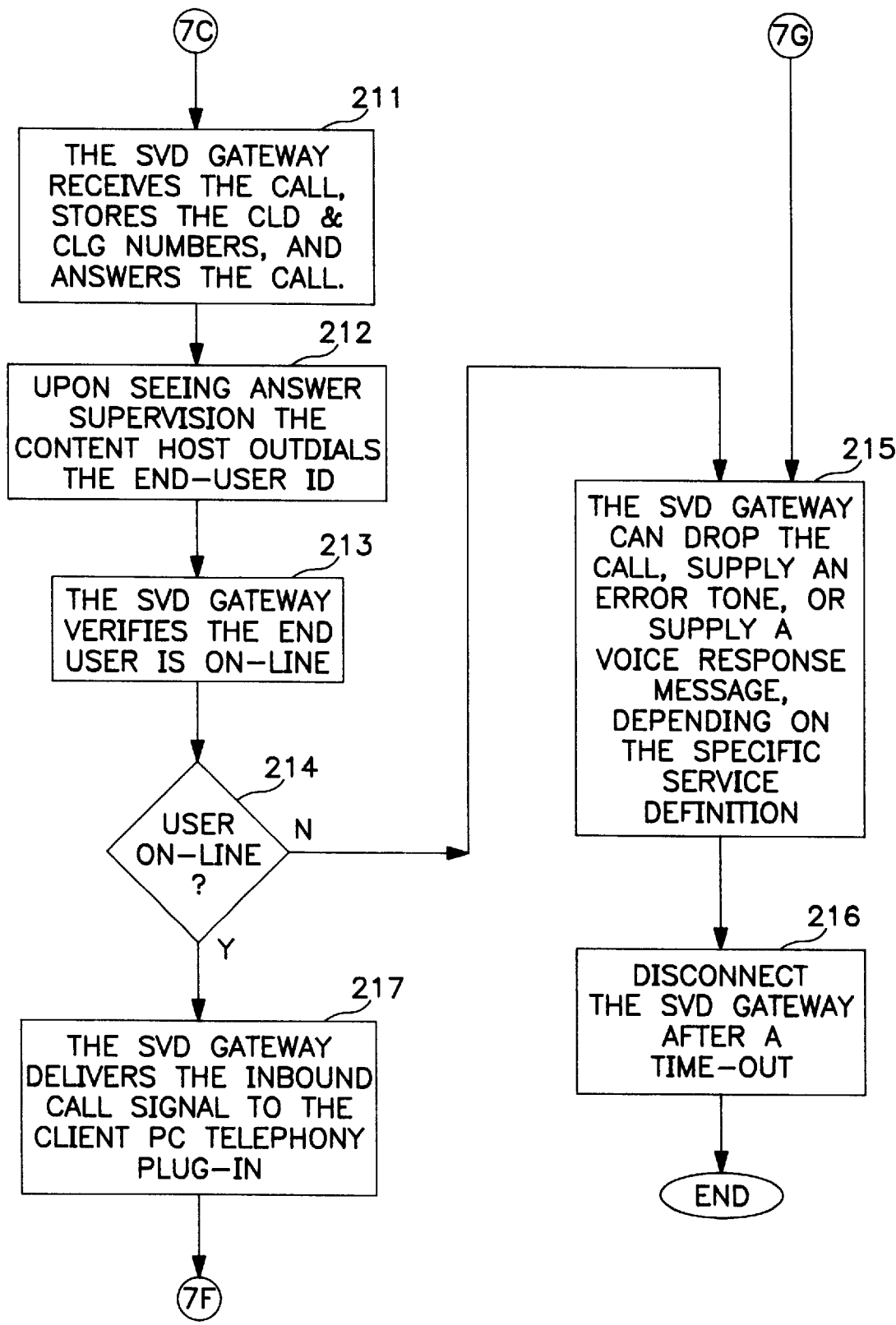

Returning to the test 208, a "yes" condition transfers the process to a node 7C shown in FIG. 7C. A step 211 is performed in response to node 7C. The step 211 causes the gateway to receive the inbound call, store the calling line's CLD and CLG numbers after which the automatic call distributor answers the call. In a step 212, the automatic call distributor upon recognizing answer supervision by the gateway 37, the content host out dials the end user ID. In a step 213, the gateway verifies the end user is on-line in a test 214. A "no" condition initiates a step 215 in which the gateway can drop the call, supply an error tone, or supply a voice response message depending on the specific service definition. A disconnect is performed by the gateway after a time out in a step 216, after which the process 200 ends.

Figure 7D:
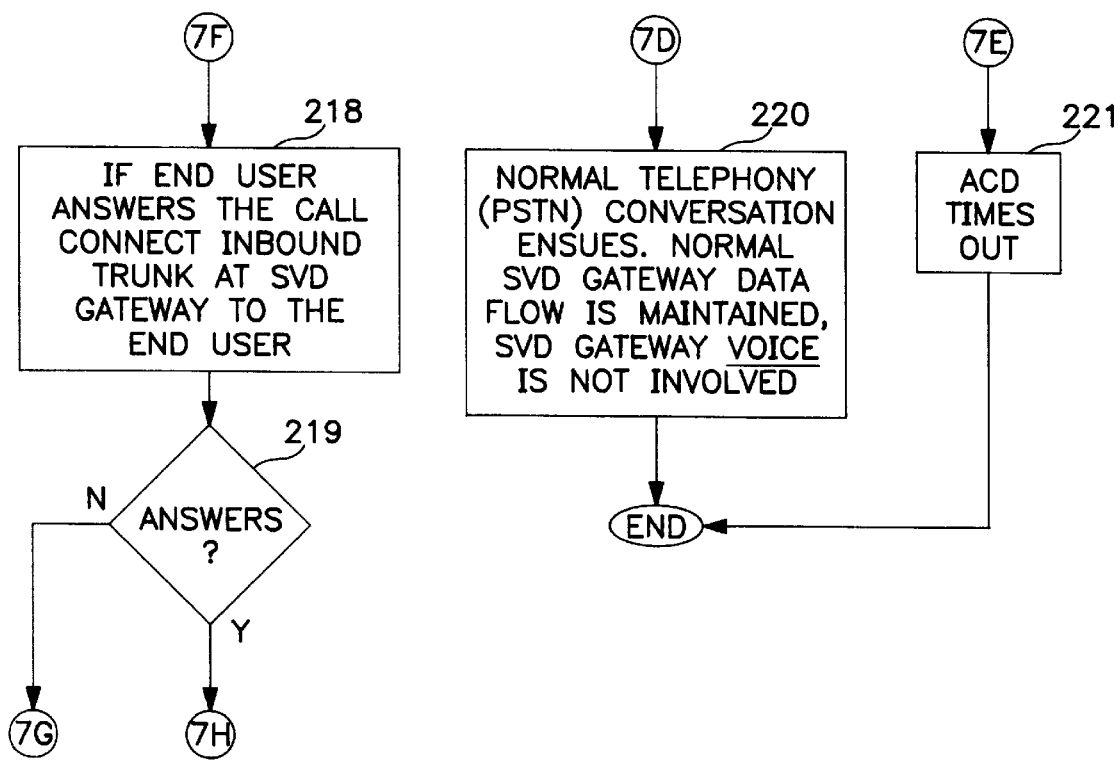

Returning to the test 214, a "yes" condition initiates a step 217 in which the gateway delivers the in-bound call signal to the user telephone plug-in, after which the process transfers to a node 7F in FIG. 7D.

In response to node 7F, a step 218 is performed by the gateway in the event the end user answers the call. When this occurs, the gateway connects the in-bound trunk at the gateway to the end user and determines in a test 219 whether the user answers the call. A "no" condition transfers the process to a node 7G in FIG. 7C in which the steps 215, 216 are performed, after which process 200 ends. A "yes" condition transfers the process to a node 7H in FIG. 6E in which the gateway monitors the user and content host provider for disconnect in a step 131 after which the steps 132 and 133 (See FIG. 6F), after which the process ends.

Returning to node 7D in FIG. 7D at which the end user's second line is answered, a step 220 is performed in which normal telephone (PSTN) conversation ensues. Normal gateway data flow is maintained and gateway voice is not involved, after which the process ends.

In response to node 7E at which the user's line is not answered, a step 221 is performed by the automatic call distributer to time out the call, after which the process ends.

Summarizing, the invention has described new functionality added to both data and voice networks by using each to their optimum advantage without requiring change to currently installed voice switches or circuits, or automatic call distributors. Two ways are available to an end user to control call direction for selected calls with a content host without the necessity of knowing the calling line (CLD) number. Also, the automatic call distributor can call the user, using the gateway's calling line number and the gateway can make a match on the data and voice calls.

Finally, many of today's service providers grant you a temporary internet address using a protocol call Dynamic Host Control Protocol (DHCP). In such case, the end user does not have a permanent, configured, internet address, and the gateway cannot build that part of a profile. To overcome such limitation, as a configuration option, the plug-in at the user PC can always read a currently assigned internet address from the browser and send it to the gateway with each connection request. A plug-in would then always send an SVD issued user ID, possibly the user's real telephone number so that there is always a constant in the message that will allow a mapping of the in-bound calls to the correct end user.

While the invention has been shown and described in connection with a preferred embodiment, various changes may be made therein without departing from the spirit and scope of the invention as defined in the appended claims.

We claim:

1. A communication system for concurrent voice and data transmissions between a client and a service provider representative in a distributed information network, comprising:
    a) a computer including a voice terminal and a modem coupled through a single shared voice and data line to a shared voice/data (SVD) gateway, the SVD gateway enabling the client to interact with the network for data acquisition purposes and the service provider representative for voice messaging;
    b) a content host system including a data terminal coupled to the gateway through a distributed network, the host system providing screens to the client through the distributed network in response to data acquisition inquiries by the client;
    c) a communication network coupling the gateway and the host system;
    d) an automatic call distributor and the gateway enabling concurrent voice transmissions between (i) the client and the service provider representative over the communication network and (ii) data transmissions between the client and host system over the distributed network as a paired call; and
    e) action button means included in the screens for initiating voice transmissions between the client and the service provider representative over the communication network concurrently while data transmissions occur between the client and the data server wherein a first action button initiates a call from the client to the service provider representative and a second action button initiates a call from the service provider representative to the client.

2. The communication system of claim wherein 1 the gateway is a shared voice/data server and is programmable by the client.

3. The communication system of claim 1 further comprising a single channel communication path connecting the modem to the gateway.

4. The communication system of claim 1 wherein the distributed information network is the Internet and the communication network is the public switched telephone network.

5. The communication system of claim 1 further comprising: a browser installed in the computer and containing plug-in modules enabling the gateway to support voice and data transmissions between the gateway and the service provider representative.

6. The communication system of claim 1 wherein:
    a) the gateway functions as a shared voice data server for the distributed network and is located in the communication network.

7. The communication system of claim 1 further comprising:
    a) storage information in the computer and available to the gateway and the content host system for implementing voice and data transmissions between the computer and the content host system.

8. The communication system of claim 1 further comprising:
    a) storage information in the content host system for supporting voice and data transmission between the computer and the content host system.

9. The communication system of claim 1 further comprising:
    a) storage information in the gateway for controlling the interaction between the content host system and the computer using the action buttons.

10. In a distributed information network including a content host system and a computer linked to a communication network, the computer including a voice terminal and a modem coupled over a single shared voice/data communication path to the communication network and the distributed information network through a gateway, a method for concurrent voice and data transmissions between a client and (i) a service representative of the content host system and (ii) the distributed information network, comprising the steps of:
    a) enabling the client to interact with the content host system over the distributed information network for data acquisition purposes;
    b) providing screens to the client through the distributed information network from the content host system in response to data acquisition inquiries by the client;
    c) coupling the gateway and the content host system to an automatic call distributor for concurrent (i) voice transmissions over the communication network between the client and a service representative of the content host system and (ii) data transmissions between the client and host system over the distributed network as a paired call; and
    d) using action button means included in the screens for initiating voice transmissions between the client and the service provider representative over the communication network concurrently while data transmissions occur between the client and the data server wherein a first action button initiates a call from the client to the service provider representative and a second action button initiates a call from the service provider representative to the client.

11. The method of claim 10 further comprising the step of:
a) using action buttons included in the screens for initiating the voice transmissions between the client and the service representative over the communication network concurrently while data transmissions occur between the client and the content host system.

12. The method of claim 11 further comprising the steps of:
a) establishing data files for the client and the service representative to automatically dial out a phone number for a voice or data connection between the client and the service representative or vice versa.

13. The method of claim 10 further comprising the step of:
a) handling a voice transmission in the communication network and a data transmission in the distributed information network as a call pair.

14. An article of manufacturing, comprising:
a computer usable medium having computer readable program code means embodied therein for concurrent voice and data transmissions in a communication network and a distributed information network, respectively, between a client and a service provider representative in a content host system through a single shared voice/data line and a gateway, the computer readable program code means in said article of manufacturing comprising:
   a) computer readable program means for enabling the client to interact with the service representative in the content host system over the distributed information network for data acquisition purposes using the single shared voice/data line and the gateway;
   b) computer readable program code means for providing screens to the client through the distributed information network from the content host system in response to data acquisition inquiries by the client;
   c) computer readable program code means for coupling the gateway to the client and to the communications network and the host system via an automatic call distributor for voice transmissions between the client and the service representative of the host system concurrently while data transmissions between the client and host system occur in the distributed network as a paired call; and
   d) computer program means for using action button means included in the screens for initiating voice transmissions between the client and the service provider representative over the communication network concurrently while data transmissions occur between the client and the data server wherein a first action button initiates a call from the client to the service provider representative and a second action button initiates a call from the service provider representative to the client.

15. An article of manufacturing, comprising:
a computer usable medium having computer readable program code means embodied therein for concurrent voice and data transmissions in a communication network and a distributed information network, respectively, between a client and a service representative in a content host system through a computer system and a gateway, the computer readable program code means in said article of manufacturing comprising:
   a) computer readable program means for enabling the client to interact with a service representative in the content host system over the distributed information network for data acquisition purposes;
   b) computer readable program code means for providing screens to the client through the distributed information network from the content host system in response to data acquisition inquiries by the client;
   c) computer readable program code means in the gateway for establishing through an automatic call distributor a call pair between the gateway and the content host system in the distributed information network and (ii) through the communication network to the service representative as the call pair; and
   d) computer readable program code means for controlling action buttons displayed in the computer system for establishing a voice connection between a client using the computer system and the service representative for the content host system using action button means included in the screens for initiating voice transmissions between the client and the service provider representative over the communication network concurrently while data transmissions occur between the client and the data server wherein a first action button initiates a call from the client to the service provider representative and a second action button initiates a call from the service provider representative to the client.

* * * * *